United States Patent [19]

Toye

[11] 4,068,144
[45] Jan. 10, 1978

[54] LIQUID JET MODULATOR WITH PIEZOELECTRIC HEMISPHERAL TRANSDUCER

[75] Inventor: Larimore F. Toye, Irving, Tex.

[73] Assignee: Recognition Equipment Incorporated, Dallas, Tex.

[21] Appl. No.: 724,786

[22] Filed: Sept. 20, 1976

[51] Int. Cl.² .................................................. H01L 41/04
[52] U.S. Cl. ..................................... 310/327; 346/75; 310/328; 310/371
[58] Field of Search .................... 310/8.2, 8.3, 9.6, 8.1, 310/327, 328, 371; 346/75, 140

[56] References Cited

U.S. PATENT DOCUMENTS

| 2,512,743 | 6/1950 | Hansell | 310/8.2 X |
| 3,150,592 | 9/1964 | Stec | 310/8 X |
| 3,215,078 | 11/1965 | Stec | 310/8 X |
| 3,832,579 | 8/1974 | Arndt | 310/8.3 X |

OTHER PUBLICATIONS

IBM Technical Disclosure Bulletin, vol. 16, No. 4, 9/73, p. 1168. Focusing Ink Jet Head by K. A. Krause.
IBM Technical Disclosure Bulletin, vol. 16, No. 4, 9/73, p. 1251–1253. Ink Jet Copier Nozzle Array by R. L. Fowler.

*Primary Examiner*—Mark O. Budd
*Attorney, Agent, or Firm*—John E. Vandigriff; Thomas W. DeMond

[57] ABSTRACT

A modulator for the generation of uniform liquid drops over a wide bandwidth of drop rates is provided. The concave and convex surfaces of a hemispherical piezoelectric crystal are electroded, and the transducer formed thereby is seated within and bonded to the wall of a concave well in the face of a solid epoxy crystal backing. A ring gasket is placed contiguous to the ring shaped edge of the transducer, and a nozzle plate is placed in sealed relation with the ring gasket to form a liquid chamber between the plate and the transducer. The physical dimensions of the component parts of the modulator are made smaller than the half wavelength of the shortest standing acoustical wave that can be established at the highest of the operable drop frequency rates in a structure of the same material as the part in question.

The bandwidth of operating frequencies may be expanded, the tolerance to ink pressure variations may be increased, and a more stable droplet break-off distance from the nozzle plate may be acquired by enveloping the hemispherical piezoelectric transducer in a solid epoxy crystal backing, and by having a liquid feed bore passing through the center of the transducer to a nozzle.

The hemispherical piezoelectric transducer also may be embodied in drop-on-command modulators for the generation of uniform liquid drops singularly.

10 Claims, 10 Drawing Figures

LIQUID JET MODULATOR WITH PIEZOELECTRIC HEMISPHERAL TRANSDUCER

FIELD OF THE INVENTION

The invention relates to ink droplet generation systems, and more particularly to an ink modulator having a hemispherical piezoelectric crystal for improved operating characteristics over a wide bandwidth of high frequency drop rates.

PRIOR ART

Ink modulators associated with ink jet printers heretofore have been electromechanically tuned to a particular drop rate. Any deviation from the resonant frequency has caused a deterioration in the modulator efficiency, and intolerable changes in the distance between the nozzle and the droplet break-off point. Variation in the break-off point length affects the drop charging function. With variation in the deflection control, poor quality printing has resulted.

In an ink jet printer transport system, an ink jet gun projects charged ink droplets which are deflected to form an information pattern on a moving document surface. When the transport velocity changes, it is necessary to provide a corresponding change in the drop rate. In printer systems heretofore used, adjustments of the drop rate have been unavailable without a returning of the ink modulator.

A drop-on-command modulator includes a positive displacement pump which in response to a command issues a pressure pulse to an ink chamber feeding a nozzle. If the pressure pulse is sufficient to overcome the surface tension at the nozzle tip, a drop of ink is expelled. Ink supply lines, however, represent massive pressure leaks opposing the pumping action required to push an ink drop through the nozzle.

Bowl shaped or hemispherical piezoelectric crystals long have been used in the medical and chemical industries. Hemispherical crystals have been used as concave radiators to generate ultrasonic energy in a liquid medium. 1 Rosenberg, *Sources of High-Intensity Ultrasound*, pp. 275 and 282 (1969), discloses the use of a bowl shaped piezoelectric transducer for performing ultrasonic surgery. Further, at pages 275, 286 and 287, the use of a bowl shaped Piezoelectric transducer is disclosed for producing emulsions and suspensions, and for intensifying polymerization, oxidation, reduction and fine dispersion. Wells, *Physical Principles of Ultrasonic Diagnosis*, pages 62, 63 (1969), discloses a focused bowl transducer for transferring energy to a patient immersed in water.

Other spherical radiatoring devices have been used to direct acoustical energy under water. One such device includes a flat disc piezoelectric crystal cemented to the back side of a plano-concave lens. The crystal sends acoustical waves directly into the lens material. Waves reaching the lens-liquid interface are refracted toward the acoustical axis.

In the present invention, an ink modulator comprising a hemispherical piezoelectric transducer is provided for the generation of an ink stream comprised of uniform ink droplets throughout a drop frequency range heretofore unachievable. Further, larger changes in temperature and ink pressure are accommodated without incurring unacceptable excursions of the drop break-off distance, or degrading the print quality. There is also provided a drop-on-command modulator comprising a hemispherical piezoelectric transducer for the generation of ink droplets without a loss of drive pressure in the ink supply line.

SUMMARY OF THE INVENTION

In accordance with the invention, an ink modulator comprises a hemispherical piezoelectric crystal. The concave and convex surfaces of the crystal are electroded, and the transducer formed thereby is seated within a solid epoxy backing. A ring shaped gasket is placed contiguous to the ring shaped edge of the transducer, and a nozzle plate is placed in sealed relation with the gasket to form an ink chamber between the transducer and the nozzle plate. The integrated structure of the modulator is further secured by threaded bolts passing therethrough.

The physical dimensions of the component parts of the modulator are made smaller than the half wavelength of the shortest standing acoustical wave that can be established at the highest of the operable drop frequency rates in a structure of the same material as the part in question. The overall longitudinal dimensions of the integrated modulator structure are likewise small. Mechanical resonance frequencies thereby are substantially separated from the operating frequency band. As a result, the break-off point in stable over the operating range. Further, a substantially increased bandwidth of operating frequencies is provided within which drop rate, temperature and ink pressure changes may be accommodated without a degradation in ink drop uniformity.

In another form of the invention, a solid backing envelops a hemispherical piezoelectric transducer with a central bore. An ink feed tube depends through the central bore. A nozzle is provided in fluid communication with the feed tube. The operating frequency bandwidth is substantially increased thereby, and the tolerance to ink pressure changes is improved over that experienced with the ink reservoir embodiment of the invention. In addition, a greater degree of break-off distance stability is provided with comparable drive voltages.

In a further aspect, a drop-on-command modulator comprising longitudinally adjacent hemispherical piezoelectric transducers is provided for a more efficient ink drop generation.

In a still further aspect, a drop-on-command modulator is provided wherein a hemispherical piezoelectric crystal transducer is longitudinally aligned with a valvular conduit located upstream from the transducer to provide a more efficient ink drop generation.

DESCRIPTION OF THE DRAWINGS

For a more complete understanding of the present invention and for further objects and advantages thereof, reference may now be had to the following description taken in conjunction with the accompanying drawings in which.

DESCRIPTION OF PREFERRED EMBODIMENTS

Figure 1:
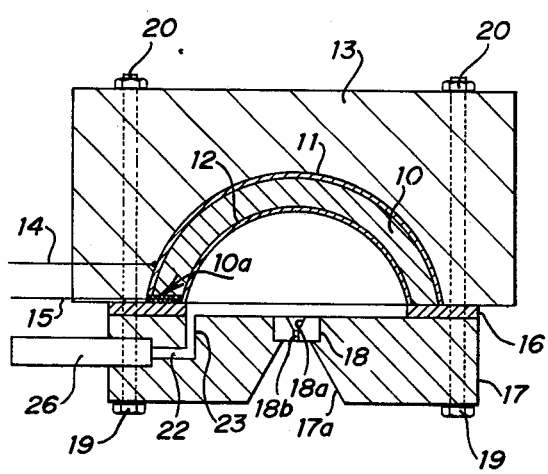
FIG. 1 is a cross-sectional side view of an ink modulator embodying the invention.
Figure 2:
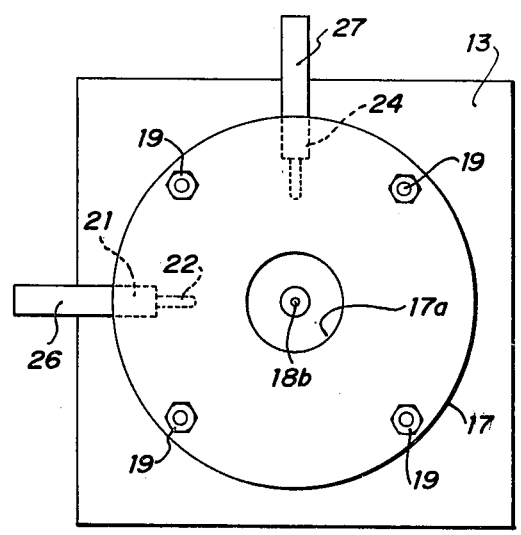
FIG. 2 is a front plan view of the modulator of FIG. 1.

FIGS. 1 and 2

Referring to FIG. 1, a hemispherical piezoelectric crystal 10 is electroded to provide electrodes 11 and 12 on the outer convex and inner concave surfaces of the crystal, respectively. The electrodes are isolated one from the other by the non-conductive ring-shaped edge of the crystal. Crystal 10 with the electrodes 11 and 12 is seated within an epoxy backing 13. A first drive lead 14 is electrically connected to electrode 11, and a second drive lead 15 is electrically connected to electrode 12. Drive lead 14 extends through backing 13 to an external voltage source. Drive lead 15 extends through an epoxy filled trough 10a cut into crystal 10 and the electrodes, and through backing 13 to the external voltage source. One surface of a polytetrafluoroethylene (PTFE) ring gasket 16 is in contact with backing 13 and to the ring-shaped edge of crystal 10. A nozzle plate 17 has a nozzle 18. Nozzle plate 17 is placed in sealed contact with the surface of gasket 16 opposite backing 13, thereby forming an ink reservoir with electrode 12. Crystal 10, backing 13, gasket 16 and nozzle plate 17 are held in place by bolts 19 having nuts 20.

Nozzle plate 17 has formed therein a first outer transverse bore 21 leading to a first inner transverse bore 22. Bore 22 is in fluid communication with a first longitudinal bore 23 of equal diameter. Bore 23 is located just inside the inner edge of gasket 16. Nozzle plate 17 further includes a second outer transverse bore 24, FIG. 2, leading to a second inner transverse bore 25. Bore 25 is in fluid communication with a second longitudinal bore formed in the same manner as bore 23. A tube 26 is sealably press fitted into bore 21, and a tube 27 is sealably press fitted into bore 24.

The outer surface of nozzle plate 17 has formed therein an outward flaring and conically shaped well 17a. Centered within the well is nozzle 18. Nozzle 18 is cylindrical in shape with a conical entrance bore 18a converging to an orfice 18b.

In a preferred embodiment described herein, backing 13 has a one inch square face, and is 0.275 inches thick. The backing is formed from an epoxy resin such as that manufactured and sold by Emerson and Cuming, Inc., of Canton, Massachusetts, and identified as Model No. 2850-KT.

Crystal 10 is a piezoelectric crystal formed from a ceramic material having a low mechanical Q and a high strain per field at constant stress, generally referred to in the art as a $d_{33}$ factor. It has been found that material having a mechanical Q no greater than 70, and a $d_{33}$ no smaller than $550 \times 10^{-12}$ meters per volt may be used. Material manufactured by Vernitron Piezoelectric Division, of Bedford, Ohio, and available as Model PZT-5H is preferred. Such material has a mechanical Q of approximately 65 and a $d_{33}$ of about $593 \times 10^{-12}$ meters/volt. The thickness of the crystal wall is approximately 0.031 inches. The inner diameter of the crystal is about 0.313 inches. Electrodes 11 and 12 are made of silver, and are adhered to crystal 10 by well known means.

Ring gasket 16 is approximately 0.005 inches thick with an inner diameter of about 0.313 inches. The ring gasket not only provides a liquid seal, but also attenuates transducer vibrations which emanate from the ring-shaped edge of crystal 10 normal to the transducer axis.

Nozzle plate 17 is made of stainless steel, and is approximately 0.090 inches in length. The well 17a formed in plate 17 has an opening about 0.30 inches in diameter defined by walls having an included angle of approximately 100°. Bores 21 and 24 of plate 17 each are approximately 0.042 inches in diameter and 0.156 inches in length. Bores 22 and 25 each are about 0.025 inches in diameter and 0.076 inches in length. Further, bore 23 is about 0.025 inches in diameter and 0.045 inches in length.

Tubes 26 and 27 each are stainless steel gauge 19 hypodermic tubing.

Nozzle 18 is formed from a cylindrical sapphire jewel approximately 0.031 inches long and 0.046 inches in diameter. The walls of entrance bore 18a of nozzle 18 define an included angle of about 70°, and converge to orifice 18b which is approximately 0.002 inches long and 0.002 inches in diameter.

In operation, ink under pressure flows through tube 26 and bores 21, 22 and 23 to the ink reservoir between crystal 10 and nozzle plate 17. Initially, tube 27 is opened to purge any fluid residue which may be present in the ink reservoir. Thereafter, tube 27 is closed off and the ink exits only through nozzle 18. Voltage pulses applied to leads 14 and 15 cause the crystal 10 to expand and contract in the region between electrodes 11 and 12. The ink within the ink reservoir thereby is pressure modulated. The pressure wave is transmitted through the nozzle 18 and down the ink stream. The stream breaks into droplets.

The physical dimensions of the component parts of the ink modulator are smaller than the half wavelength of the shortest standing acoustical wave that can be produced at the highest of the openable drop frequency rates in a structure of the same material as the part in question. Further, the longitudinal length of the modulator is less than the wavelength of the shortest standing longitudinal acoustic wave that can be established in the assembled body of the modulator. A wide bandwidth of drop rate frequencies thereby is provided which is far enough below the mechanical frequencies of the modulator to be effectively isolated from the effects of both the resonance frequencies, and the harmonics thereof which may be excited during a printing operation. As a result, the ink droplet break-off distance is substantially uniform over the operating range, and the tolerance of the modulator to drop rate, temperature and ink pressure changes is improved. The primary ink drop path is substantially free of satellite drops. Uniform ink droplets are generated over a frequency range up to a topmost operating frequency approximately 3.5 times the lowermost operating frequency.

FIG. 3

Figure 3:
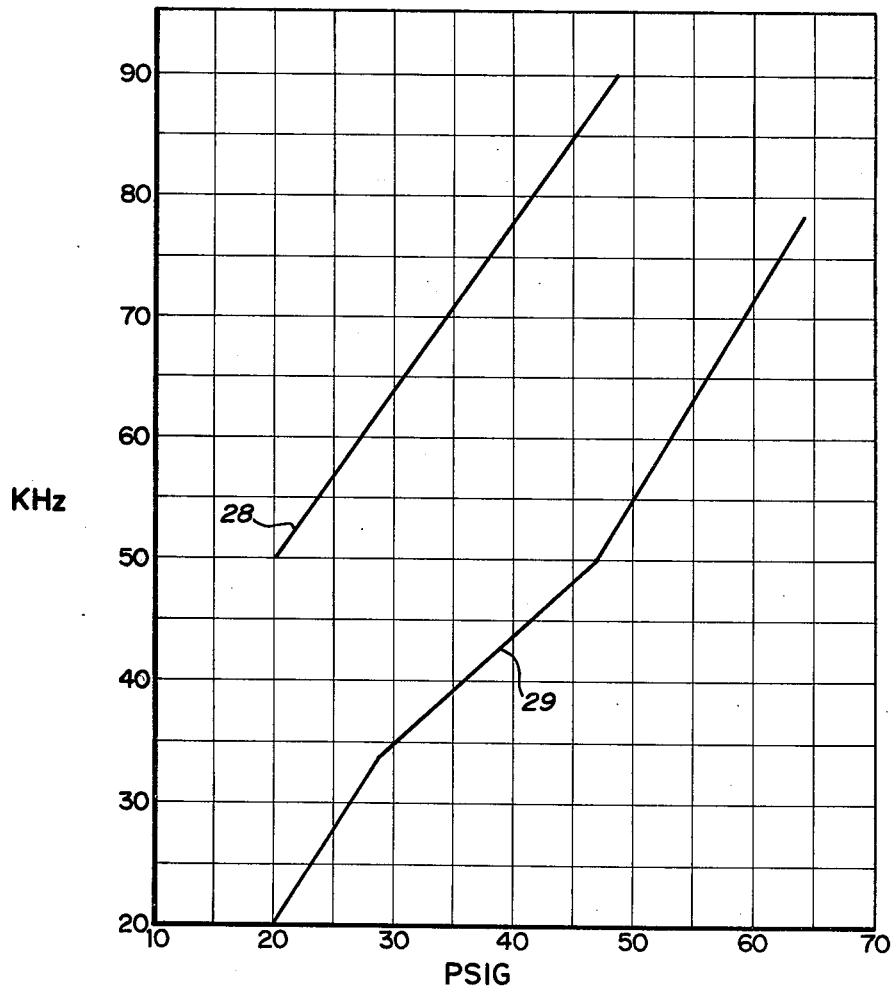
FIG. 3 is a graph of the frequency-pressure operating characteristics of the ink modulator of FIG. 1.

Crystal 10 may be characterized as a 165° crystal. That is, an angle of 165° is defined by radial lines in the same plane and projecting from the center of curvature to opposing points on the ring shaped edge of the crystal. In FIG. 3, curves 28 and 29 represent the low and high pressure limits, respectively, of an operating envelope for an ink modulator having a 165° crystal operating at drop frequency rates between 20 and 90 KHz.

It has been found that with a constant 30 volt crystal drive voltage, the ink modulator may be operated within the envelope defined by curves 28 and 29 without producing satellite droplets. Further, the ink droplet break-off distance from the nozzle remains substantially uniform, and sensitivity to temperature change is less acute than with prior systems.

Curves 28 and 29 further illustrate a tolerance to ink pressure changes over a band of high frequency drop rates wider than heretofore achieved.

FIG. 4

Figure 4:
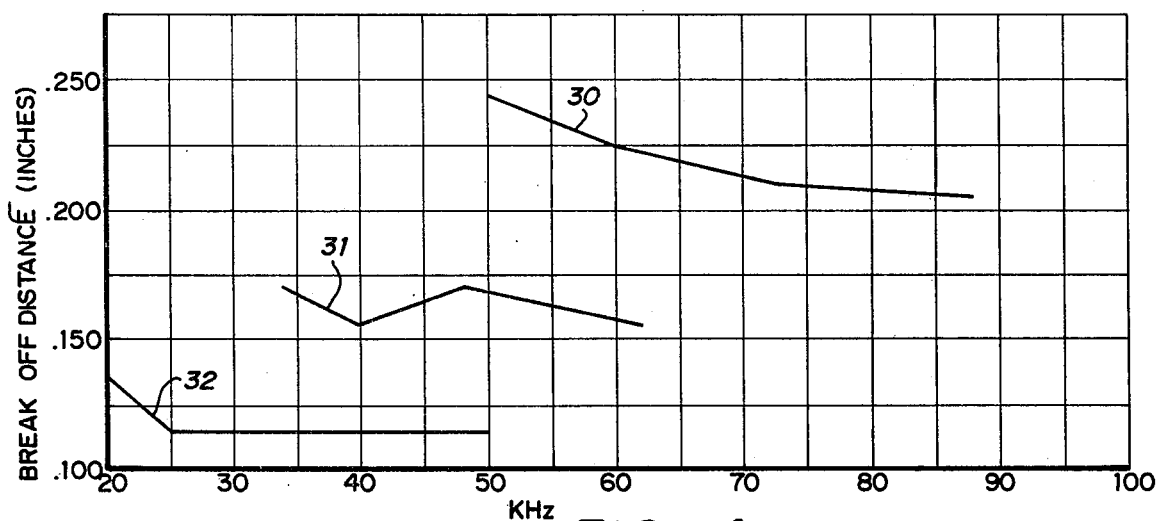
FIG. 4 is a graph of the ink droplet break-off distance versus frequency operating characteristics of the modulator of FIG. 1.

In FIG. 4 break-off distance versus frequency is plotted. Curves 30-32 are representative of the operation of an ink modulator having a 165° crystal driven with a constant 30 volt crystal drive voltage. More particularly, curve 30 illustrates the change in ink drop break-off distance from the nozzle for drop rates in the 50 to 88 KHz range where ink pressure is maintained at 47 PSIG. For pressure between 50 and 60 PSIG, the break-off distance varies according to curve 30 where it has a negative slope of about 0.002 inches per kilohertz. Further, the break-off distance follows curve 30 where it has a negative slope of about 0.0012 inches per kilohertz between drop rates of 60 and 73 KHz, and varies according to curve 30 where it has a negative slope of about 0.0003 inches per kilohertz between drop rates of 73 and 90 KHz.

Curve 31 illustrates the change in break-off distance as the drop rate is varied from 34 to 62 KHz. Between 34 and 40 KHz, the break-off distance follows curve 31 where it has a negative slope of about 0.0025 inches per kilohertz. Between 40 and 48 KHz, however, the break-off distance varies according to curve 31 where it has a positive slope of approximately 0.0019 inches per kilohertz. The break-off distance follows curve 31 where it has a negative slope of about 0.00104 inches per kilohertz at drop rates between 48 and 62 KHz.

Curve 32 illustrates the change in break-off distance as the drop rate is varied from 20 to 50 KHz at a constant ink pressure of 20 PSIG. Between 20 and 25 KHz, the break-off distance varies according to curve 32 where it has a negative slope of 0.004 inches per kilohertz. No discernible change in break-off distance is detected between 25 and 50 KHz.

From an inspection of FIG. 4, it may be seen that a maximum excursion of about 0.04 inches in break-off distance is encountered between 50 and 90 KHz at 47 PSIG. Further, a maximum excursion of approximately 0.015 inches occurs between 34 and 62 KHz at 29 PSIG, and a maximum excursion of about 0.02 inches occurs between 20 and 50 KHz at 20 PSIG.

FIG. 5

Figure 5:
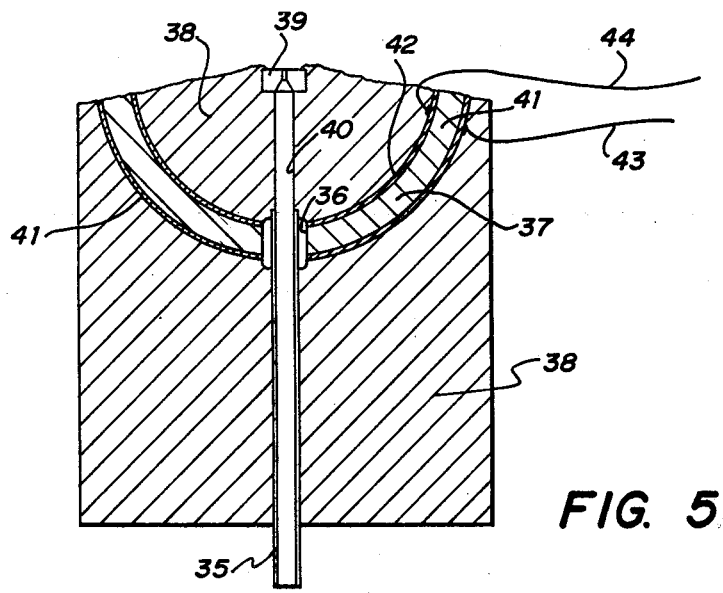
FIG. 5 is a cross-sectional side view of a solid fill ink modulator embodying the invention.

FIG. 5 illustrates a solid fill ink modulator which provides improved operating characteristics over the embodiment of FIGS. 1 and 2.

A fluid feed tube 35 passes through a central bore 36 of a hemispherical piezoelectric crystal 37. An annular air pocket is provided between the tube 35 and the walls of the bore 36 to isolate tube 35 from the radial vibrations of the crystal. Tube 35 is held in place by an epoxy backing 38 which is adhered to the convex surface of crystal 37. The concavity of crystal 37 is filled with epoxy in which the nozzle 39 is mounted and captured. A bore 40 is formed from the end of tube 35 to provide a fluid path between tube 35 and nozzle 39. Bore 40 is aligned with tube 35 and nozzle 39 on a longitudinal axis passing through the center of curvature of the crystal.

The crystal 37 is electroded to provide electrodes 41 and 42 on the outer convex and inner concave surfaces of the crystal, respectively. The electrodes are isolated one from the other by the non-conductive ring-shaped edge of the crystal. A drive lead 43 is electrically connected to electrode 41, and a drive lead 44 is electrically connected to electrode 42. The ring-shaped crystal edge is exposed to air to isolate nozzle 39 from radial crystal vibrations.

The epoxy backing 38 comprising the body of the modulator is of a type such as that manufactured and sold by the HYSOL Division of the Dexter Corporation of Olean, New York, and identified as Model No. 1C. The epoxy fill completely encloses all modulator parts except the extreme ring-shaped end of crystal 37, the orifice of nozzle 39 and that part of tube 35 exposed for connection to the ink supply.

It has been found that when backing 38 has a shape other than a hemispherical shape concentric to crystal 37, the likelihood of a standing acoustical waveform occurring in the modulator body is substantially reduced.

The fluid feed tube 35 is made of nylon, and has an outer diameter of about 0.042 inches. Bore 36 of crystal 37 is approximately 0.062 inches in diameter. Tube 35 extends past the concave crystal face a distance of about 0.030 inches. Annular air pocket 36 is approximately 0.010 inches wide between the tube 35 and the walls of bore 36. Nozzle 39 is formed from a cylindrical ruby having a length of approximately 0.031 inches and a diameter of approximately 0.046 inches.

In operation, ink under pressure is admitted into tube 35 and bore 40 leading to nozzle 39. When crystal 37 is excited by a voltage pulse applied to drive leads 43 and 44, the ink in bore 40 is pressure modulated. The pressure wave is transmitted through nozzle 39 and down the ink stream to the droplet break-off point.

As with the ink modulator of FIG. 1, each part of the solid fill modulator has physical dimensions smaller than the half wavelength of the shortest standing acoustical wave that may be produced at the highest of the operable drop frequency rates in a structure of the same material as the part in question. A wider bandwidth of drop rates is provided thereby within which larger variations in ink pressure may be tolerated than with the liquid fill modulator of FIG. 1.

FIG. 6

Figure 6:
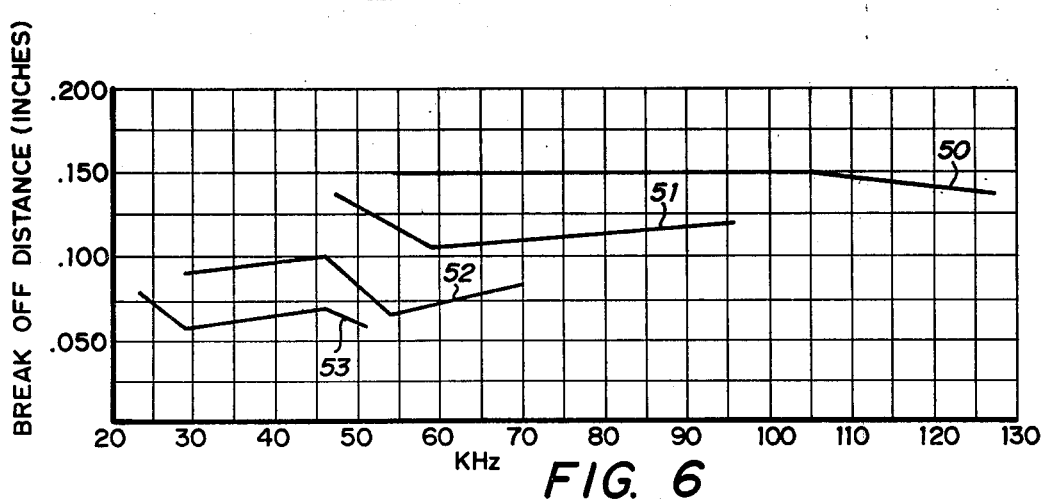
FIG. 6 is a graph of the ink droplet break-off distance versus frequency operating characteristics of the modulator of FIG. 5.

FIG. 6 illustrates the break-off distance versus frequency operating characteristics of the solid fill modulator of FIG. 5.

Curves 50-53 are representative of the operation of the solid fill modulator at a constant 120 volt crystal drive voltage. More particularly, Curve 50 illustrates the variation in ink drop break-off distance from the nozzle as the operation frequency is varied between 55 and 127 KHz at 64 PSIG. No discernible change in break-off distance is detected below 106 KHz. Between 106 KHz and 127 KHz, however, the break-off distance varies according to curve 50 where it has a negative slope of about 0.0005 inches per kilohertz.

Curve 51 illustrates changes in the break-off distance as the operating frequency is varied between 47 KHz and 96 KHz at an ink pressure of 47 PSIG. Between 47 KHz and 59 KHz, the break-off distance varies according to curve 51 where it has a negative slope of 0.00038 inches per kilohertz. Between 59 and 96 KHz, the break-off distance varies according to curve 51 where it has a positive slope of 0.0028 inches per kilohertz.

Curve 52 illustrates the break-off distance variation as the operating frequency is varied between 29 and 70 KHz at an ink pressure of 29 PSIG. Between 29 and 46 KHz, the break-off distance varies according to curve 52 where it has a positive slope of 0.0006 inches per kilohertz. The break-off distance follows curve 52 where it has a negative slope of 0.0044 inches per kilohertz between 46 and 54 KHz. Further, the break-off distance varies according to curve 52 where it has a positive slope of 0.0012 inches per kilohertz between 54 and 70 KHz.

Curve 53 illustrates the changes in break-off distance which occur when the operating frequency is varied between 23 and 51 KHz at 20 PSIG. Between 23 and 29 KHz, the break-off distance follows curve 53 where it has a negative slope of 0.003 inches per kilohertz. Further, the break-off distance varies according to curve 53 where it has a positive slope of 0.0006 inches per kilohertz between 29 and 46 KHz. Between 46 and 51 KHz, however, the break-off distance follows curve 53 where it has a negative slope of 0.002 inches per kilohertz.

The maximum excursion of the break-off distance at an ink pressure of 64 PSIG is 0.01 inches between 55 and 127 KHz. The maximum excursion at 47 PSIG is 0.030 inches between 47 and 96 KHz. Between 29 and 70 KHz, the maximum excursion is 0.035 inches at 29 PSIG. Further, the maximum excursion at 20 PSIG is 0.02 inches between 23 and 51 KHz.

The solid fill modulator thus accommodates a larger excursion in ink pressure over a larger bandwidth of drop rates than the liquid fill modulator of FIG. 1.

Where the ink pressure and crystal drive voltage of the solid fill modulator may be dynamically adjusted as the frequency is varied between 25 and 125 KHz, a variation in break-off distance less than ± 0.020 inches from a substantially linear norm has been observed over the entire operating range.

A comparison of the droplet break-off distances over the respective operating ranges of the liquid fill and solid fill modulators, as described herein, reveals a shorter break-off distance for the solid fill modulator at each operable drive voltage. Further, the average displacement of break-off distances from substantially linear norms is twice as great for the liquid fill modulator than for the solid fill modulator.

FIG. 7

Figure 7:
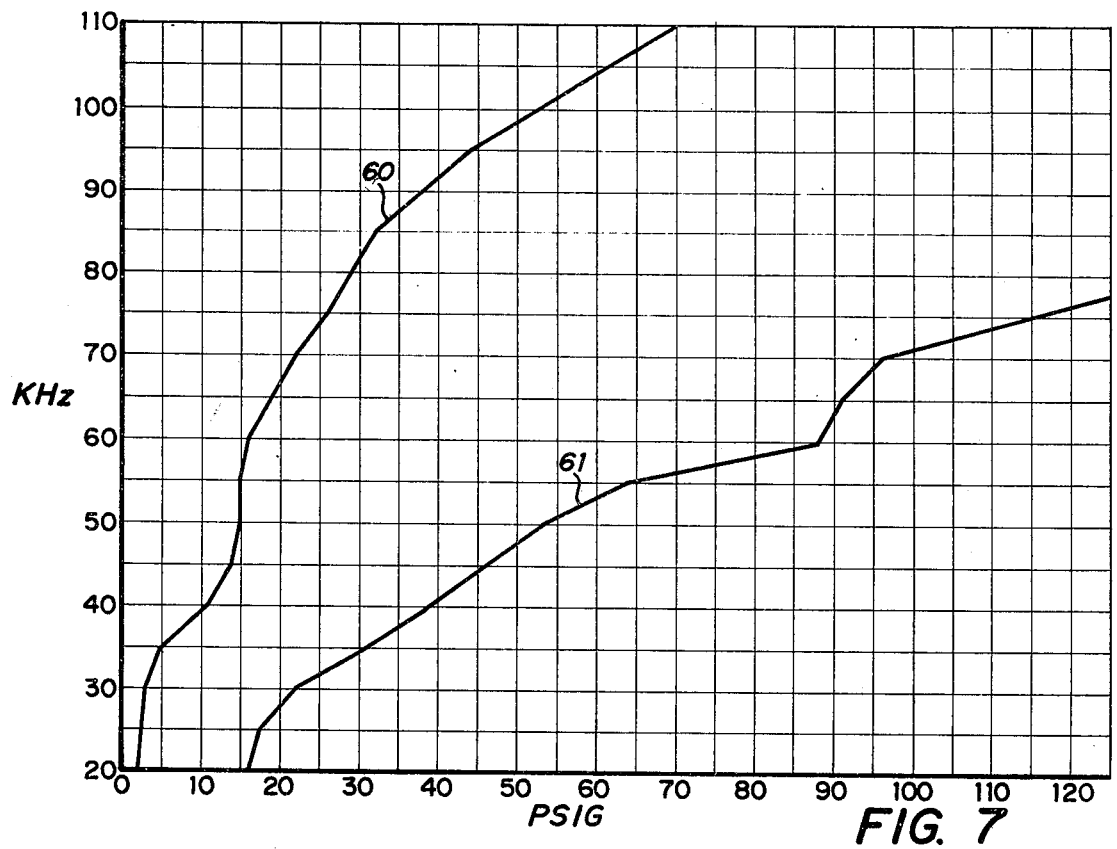
FIG. 7 is a graph of the frequency versus ink pressure operating characteristics of the modulator of FIG. 5.

FIG. 7 illustrates the frequency-pressure operating characteristics of the solid fill modulator of FIG. 5 at a constant 120 volt crystal drive voltage.

Between a low pressure limit curve 60 and a high pressure limit curve 61, the ink pressure may be varied at any frequency between 20 and 100 KHz without the generation of satellite droplets. The low limit curve 60 occurs when either the ink droplets are almost tangent in the ink stream or a satellite condition occurs. At the high pressure limit as illustrated by curve 61, satellite drops begin to form.

FIG. 8

Figure 8:
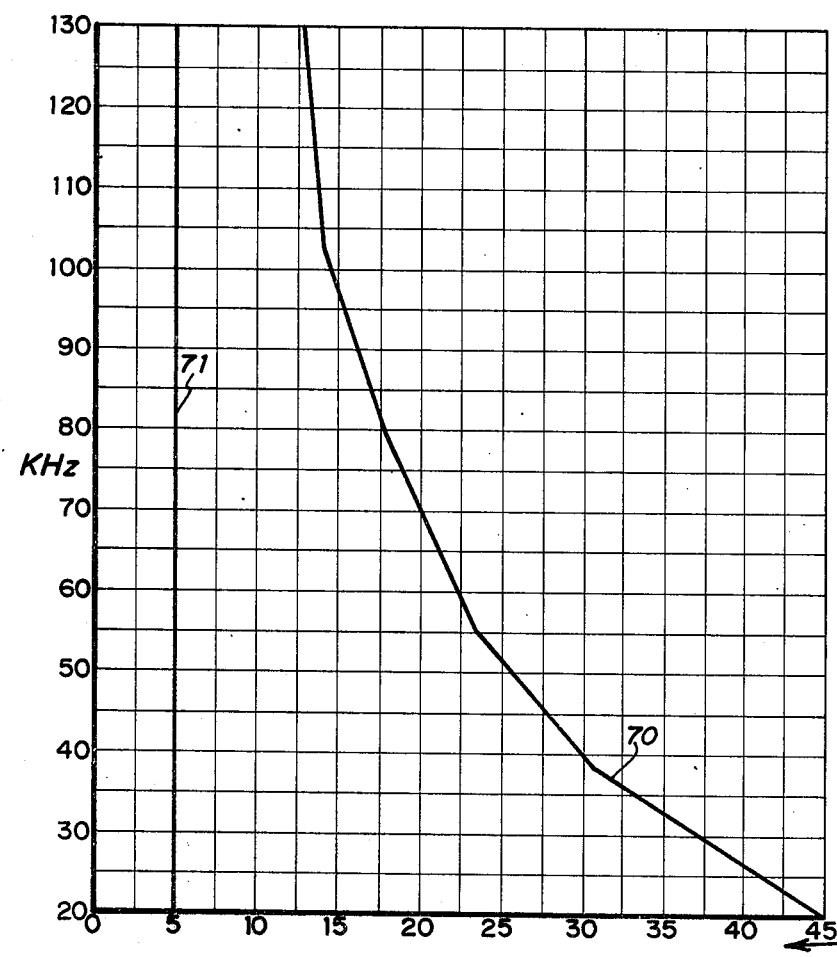
FIG. 8 is a graph of the frequency versus drop spacing characteristics of the modulator of FIG. 5.

FIG. 8 illustrates the drop spacing versus frequency characteristics of the solid fill modulator of FIG. 5.

Within the operating frequency-pressure envelope illustrated in FIG. 7 and with a constant 120 volt crystal drive voltage, the operating frequency of the solid fill modulator may be varied between 20 and 130 KHz to determine the drop spacing boundaries illustrated as a curve 70 and a line 71 in FIG. 8. Curve 70 defines the maximum drop spacing boundary beyond which a satellite condition occurs. The vertical line 71 indicates the minimum drop spacing that may be acquired. Since a drop diameter is approximately 0.004 inches, the minimum drop center spacing with 0.001 inches of drop separation is approximately 0.005 inches.

If the crystal drive voltage and ink pressure are dynamically adjusted with a change in frequency, the modulator produces satellite free droplets from 5 KHz to above 160 KHz.

FIG. 9

Figure 9:
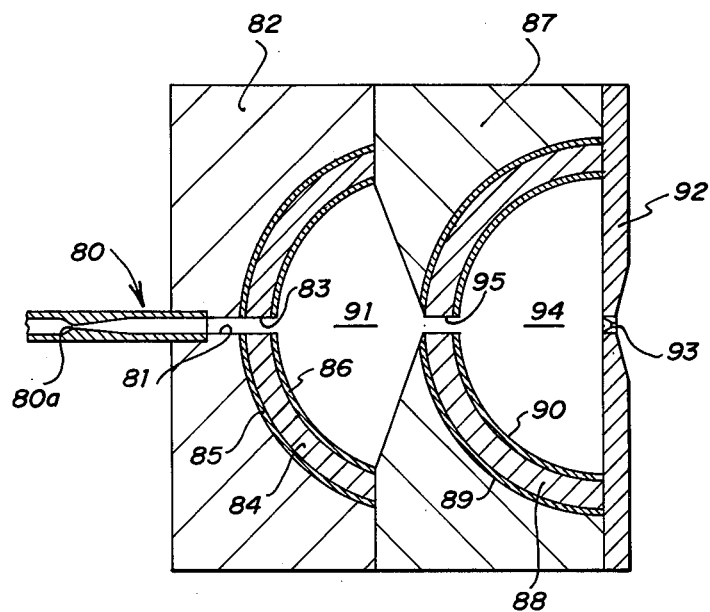
FIG. 9 is a cross-sectional side view of a drop-on-command ink modulator embodying the invention.

FIG. 9 illustrates a positive displacement drop-on-command ink modulator embodying the invention.

A fluid feed tube 80 having a flow restrictor 80a is sealably press fitted into a bore 81 of an epoxy backing 82. In fluid communication with bore 81 is a central bore 83 of a 150° to 165° hemispherical piezoelectric crystal 84. The concave and convex surfaces of the crystal 84 are electroded to provide electrodes 85 and 86, respectively. A second solid epoxy backing 87 is adhered with an epoxy bonding agent to backing 82, and formed in contact with the convex surface of a 150° to 180° hemispherical piezoelectric crystal 88. The convex and concave surfaces of crystal 88 are electroded to provide electrodes 85 and 90, respectively.

An ink chamber 91 is formed between the concave surface of crystal 84 and a cone-shaped well in backing 87 defined by radii of curvature between the center of curvature of crystal 84 and the extreme inner edges of the crystal. Bonded to backing 87 and the ring-shaped edge of crystal 88 is a nozzle plate 92 having a nozzle 93. Between nozzle plate 92 and the concave inner surface of crystal 88 is a second ink chamber 94. A central bore 95 of crystal 88 forms a fluid path between chambers 91 and 94. Tube 80, bores 81 and 83, chamber 91, bore 95, chamber 94 and nozzle 93 are in fluid communication.

The drop-on-command modulator is preferably cylindrical in shape with a length of about 0.50 inches and a diameter of about 0.05 inches. Tube 80 is a nylon tube having an outer diameter of approximately 0.045 inches. Bore 81, and 83 are each approximately 0.027 inches in diameter, and bore 95 is about 0.015 inches in diameter.

In operation, the crystal 84 is excited, to raise the ink pressure in the ink chamber 94. The fluid diode operation provided by crystal 84 and the restriction 80a in tube 80 act in concert to substantially prevent a pressure drop in the ink chamber 94. Thus, if the crystal 88 is excited during the period that the pressure of chamber 94 is raised, a relatively small displacement of crystal 88 is required to produce a drop at nozzle 93.

In the preferred embodiment, crystal 88 is excited up to ten microseconds after crystal 84 is excited. Further, the pulses driving each of the crystals are shaped with rise times approximately one-fourth the decay times.

The decay times are larger than the rise times to prevent the suction of air into the ink chamber 94.

FIG. 10

Figure 10:
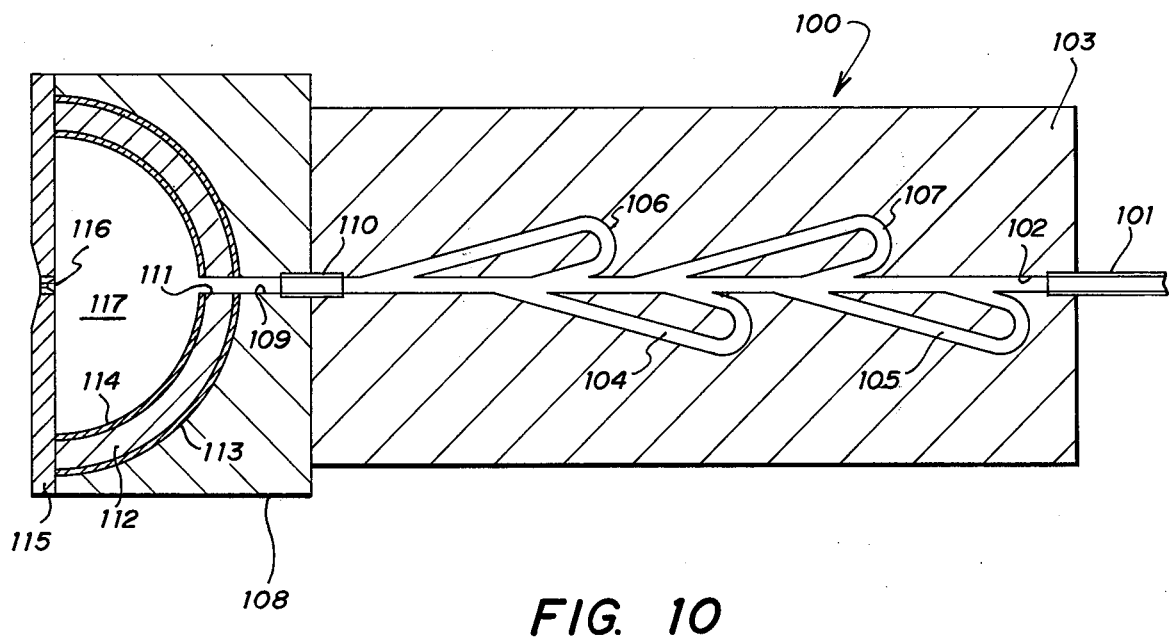
FIG. 10 is a cross-sectional side view of a second drop-on-command ink modulator embodying the invention.

FIG. 10 illustrates a drop-on-command modulator embodying the invention, and further including a valvular conduit 100 as disclosed in U.S Pat. No. 1,329,559 to Tesla.

Referring to FIG. 10, the valvular conduit 100 is employed upstream from the ink reservoir of an ink modulator embodying the invention. More particularly, a fluid feed tube 101 is sealably press fitted into a longitudinal through-bore 102 of a solid epoxy backing 103. On a first side of bore 102 are fluid channels 104 and 105 providing an opposing fluid feedback to bore 102. On an opposite side and staggered from channels 104 and 105 are fluid channels 106 and 107 also providing an opposing fluid feedback to bore 102.

Abutting and bonded to backing 103 is a solid backing 108 having a through-bore 109. A fluid feed tube 110 is sealably press fitted into bores 102 and 109. Bore 109 is aligned with bore 102 and leads to a central bore 111 of a 150° to 180° hemispherical piezoelectric crystal 112 seated in housing 108. The convex and concave surfaces of crystal 112 are electroded to provide electrodes 113 and 114, respectively. Bonded to backing 108 and the ring-shaped edge of crystal 112 is a nozzle plate 115 having a nozzle 116. An ink reservoir 117 is formed thereby between the concave surface of electrode 114 and the nozzle plate 115. Bore 102, tube 110, bores 109 and 111, chamber 117 and nozzle 116 are in fluid communication.

In operation, ink under pressure is admitted into tube 101 and throughbore 102 to ink chamber 117. When crystal 112 is excited, the pressure of ink chamber 117 increases to generate an ink drop at nozzle 116. Fluid channels 104–107 are shaped to provide a restriction to fluid flow from tube 110 to tube 101. Thus, the increase in pressure in chamber 117 is not dissipated through the ink supply line.

Having described the invention in connection with certain specific embodiments thereof, it is to be understood that further modifications may now suggest themselves to those skilled in the art. It is intended to cover such modifications as fall within the scope of the appended claims.

What is claimed is:

1. A liquid jet modulator, which comprises:
   a. a hemispherical piezoelectric transducer, said transducer having a central bore;
   b. a backing enveloping said transducer and having a throughbore aligned with said central bore;
   c. a fluid feed tube in sealed relation with said throughbore and depending through said central bore in spaced apart relation with said transducer; and
   d. nozzle means captured within said backing adjacent the concave inner surface of said transducer, and in fluid communication with said throughbore and said feed tube for expelling liquid droplets.

2. The combination set forth in claim 1, wherein said transducer includes;
   a. a hemispherical piezoelectric crystal;
   b. a first electrode adhered to the convex outer surface of said crystal about said central bore; and
   c. a second electrode electrically isolated from said first electrode and adhered to the inner concave surface of said crystal about said central bore.

3. The combination set forth in claim 2, wherein the ring-shaped edge of said crystal is exposed to air.

4. A drop-on-command modulator for generating liquid drops singularly, which comprises:
   a. first and second hemispherical piezoelectric transducers having formed therein first and second central bores, respectively;
   b. a first backing having a hemispherical well on one face thereof for accommodating said first of said transducers, and further having a throughbore aligned with said first of said central bores;
   c. a second backing bonded to said first backing about said hemispherical well, and bonded to the outer convex surface of said second of said transducers about said second of said central bores to form a first liquid chamber between said second backing and said first of said transducers; and
   d. a nozzle plate bonded to said second backing to form a second liquid chamber between said nozzle plate and said second of said transducers, said nozzle plate having an orifice aligned with said throughbore and said first and said second central bores.

5. The combination set forth in claim 4, wherein said first and second of said transducers are each comprised of:
   a. a hemispherical piezoelectric crystal;
   b. a first electrode adhered to the outer convex surface of said crystal; and
   c. a second electrode electrically isolated from said first electrode and adhered to the inner concave surface of said crystal.

6. The combination set forth in claim 4, wherein said second backing has formed in one face thereof a conical well diverging from said second of said central bores to the inner edge of said first of said transducers.

7. A drop-on-command modulator for generating liquid drops singularly, which comprises:
   a. a first backing having a first throughbore and a hemispherical well formed into one face thereof;
   b. a hemispherical piezoelectric transducer seated within said well and having a central bore in alignment with said first throughbore;
   c. a nozzle plate bonded to said first backing to form a liquid chamber between said plate and said transducer, said plate having an orifice in liquid communication with said first throughbore, said central bore and said chamber; and
   d. a second backing bonded to said first backing and located upstream from said first throughbore, said second backing having a second throughbore in alignment with said first throughbore and further having fluid feedback bores depending from said second throughbore to oppose the reverse flow of liquid from said chamber.

8. A liquid jet modulator for the production of droplets over a wide band of drop rates comprising:
   a. a hemispherical piezoelectric transducer;
   b. a feed tube passing through said transducer;
   c. a backing material encapsulating said transducer and feed tube; and
   d. a nozzle at one end of said feed tube partially encapsulated in said backing material.

9. The modulator according to claim 8 wherein an annular air pocket is provided between the feed tube and the walls of transducer at the point the tube passes through the transducer.

10. The modulator according to claim 8 wherein the transducer has a ring-shaped edge which is not encapsulated in the backing material.

* * * * *